May 1, 1956  H. L. REITZES  2,743,762
HEAT SEALING MACHINE
Filed May 25, 1953  2 Sheets-Sheet 1

INVENTOR
HERBERT L. REITZES
BY

*Mason & Graham*

ATTORNEYS

May 1, 1956    H. L. REITZES    2,743,762
HEAT SEALING MACHINE
Filed May 25, 1953    2 Sheets-Sheet 2
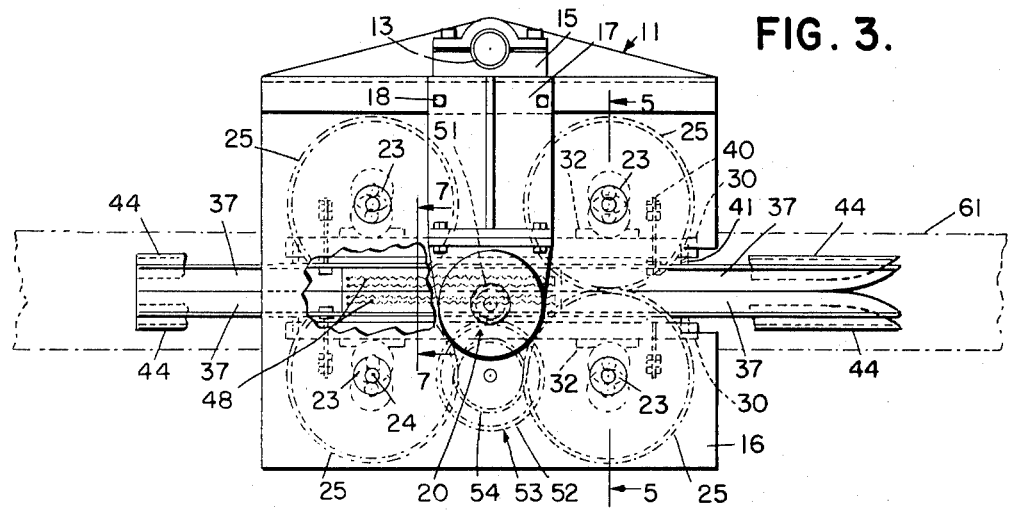
FIG. 3.
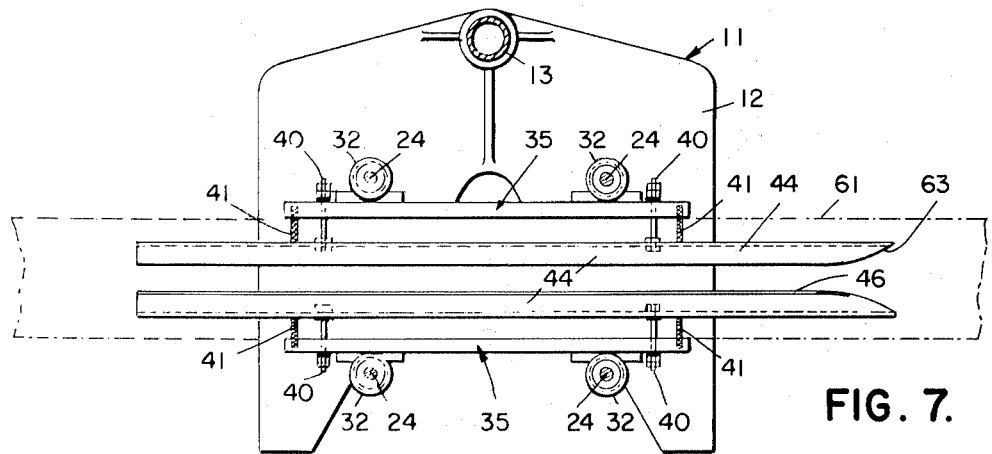
FIG. 4.
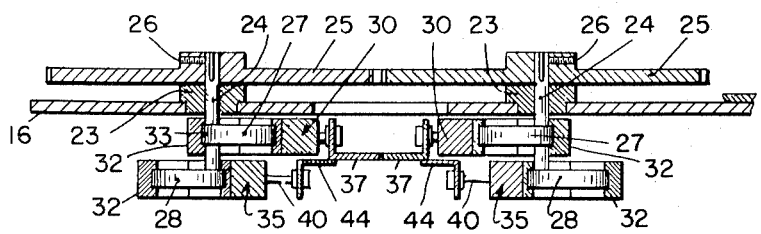
FIG. 5.
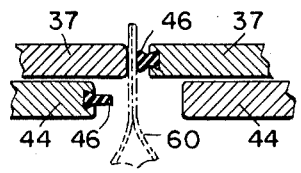
FIG. 6.
FIG. 7.
INVENTOR
HERBERT L. REITZES
BY
Mason & Graham
ATTORNEYS United States Patent Office 2,743,762
Patented May 1, 1956

2,743,762

HEAT SEALING MACHINE

Herbert L. Reitzes, Los Angeles, Calif., assignor to Globe Products-Heat Seal Corporation, a corporation of California Application May 25, 1953, Serial No. 357,052

11 Claims. (Cl. 154—42)

This invention has to do with apparatus for joining thermoplastic sheets. Such apparatus is commonly used for sealing bags made of such sheet material.

An object of this invention is to provide a new and improved automatic apparatus for sealing thermoplastic bags or sheets and the like.

A particular object of the invention is to provide such apparatus in which the bags or other articles to be sealed move continuously through the apparatus. In this connection I am aware that heretofore continuous sealing apparatus has been used embodying heated rolls between which the sheets to be sealed pass. One disadvantage of such apparatus is the fact that the rolls only make line contact with the articles to be sealed and therefore they must either be quite hot or operate at a slow rotational speed in order to be effective. Another objection to the rolls is that they tend to displace the material and move it into folds and other objectional irregularties. Another disadvantage is that the rolls themselves are difficult to heat.

It therefore is a particular object of this invention to provide apparatus through which the bags or other articles to be sealed flow continuosly but one which does not have the disadvantages of apparatus embodying the heated rolls for sealing. In this connection it is an object of the invention to employ heated jaws which engage and travel with an article to be sealed without interrupting its movement.

Another object of the invention is to provide new and improved means for transporting an article in the desired direction. These and other objects will be apparent from the drawings.

Referring to the drawings which are illustrative of the preferred form of the invention:

Fig. 3 is a plan view of the apparatus of Figs. 1 and 2 with parts broken away;

Fig. 4 is a sectional plan view on line 4—4 of Fig. 2.

Fig. 5 is a sectional view on an enlarged scale on line 5—5 of Fig. 3;

Fig. 6 is a fragmentary sectional view on an enlarged scale of the inner edges of the transfer bars; and Fig. 7 is a fragmentary sectional view on an enlarged scale on line 7—7 of Fig. 3.

Figure 1:
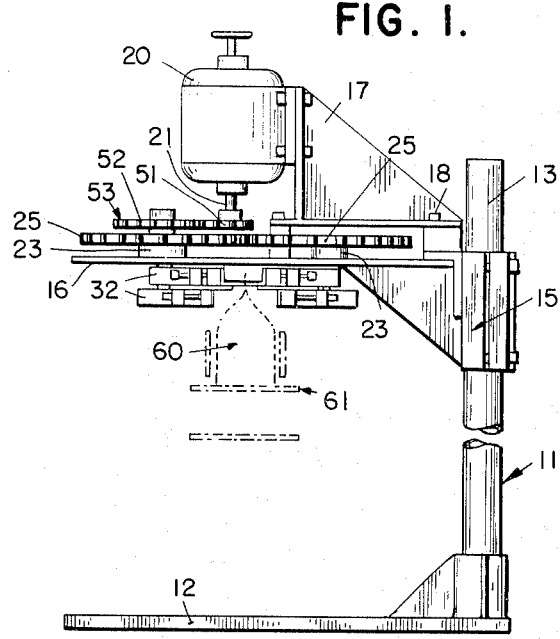
Fig. 1 is an elevational view of apparatus embodying the invention as viewed from the receiving end.

More particularly describing the invention, reference numeral 11 generally indicates a stand which has a base 12 adapted to rest on the floor or the like and a post or column 13. On the column 13 there is mounted a main mounting bracket 15 which includes a horizontally projecting shelf 16. A motor bracket 17 is detachably mounted on the bracket 15 by screws 18 for supporting a motor 20 above the shelf with its shaft 21 vertically disposed.

The shelf 16 supports four bearings 23 which receive vertically extending crankshafts 24, each of which carries a gear wheel 25 at its upper end, the latter being keyed to the shaft and fixedly secured thereto as by a set screw 26. The bearings 23 and shafts 24 are shown positioned symmetrically with each shaft at the corner of an imaginary rectangle. However, the shafts need not be so positioned so long as the shafts are arranged in pairs with the axes of the shafts of one pair in a plane parallel to a plane containing the axes of the other pair. Each shaft carries a pair of eccentrics, indicated by 27 and 28. These eccentrics are disposed in vertically spaced relation on the shafts and are so positioned that the throw of the eccentrics on each shaft is 180° apart.

Mounted on the upper eccentrics 27 of the shafts 24 are an upper pair of opposed members which I will term main bars, indicated generally by numeral 30. Each bar has a pair of journals or bearings 32 which receive the upper eccentrics on one pair of the shafts 24, the bearing being internally grooved at 33 so that axial movement of the bar relative to the shaft is prevented. A similar lower pair of main bars 35 is mounted on the lower eccentrics 28 of the shafts 24. An upper pair of opposed transfer bars 37 are carried by the bars 30. These transfer bars are of common angle shape in cross section as shown in Fig. 5. Each transfer bar is supported upon a pair of bolts 40 mounted in its supporting main bar for axial movement therein. In addition, each transfer bar is resiliently urged toward the other by a pair of springs 41 interposed between each transfer bar and its associated rotary bar.

The apparatus is also provided with a second or lower pair of transfer bars, indicated by numeral 44, which are inverted with respect to the upper pair and are mounted upon the lower main bars 35 in the same manner as the upper bars are mounted on the upper main bars. One of the lower transfer bars and the opposite upper transfer bar are provided with a strip 46 of rubber, synthetic rubber, or other resilient material along its inner edge.

I provide a pair of opposed heating and sealing elements or jaws, indicated by numeral 48, and these are positioned in the form of the invention shown one on each of the upper transfer bars so that the inner surfaces of these jaws are substantially in line with or very slightly extend beyond the inner edges of the transfer bars. These elements may be heated electrically or in any other conventional manner.

The gears 25 at each end of the apparatus mesh so that the opposed main bars and their carried transfer bars operate in opposite directions. The motor shaft 21 carries a gear 51 which meshes with teeth 52 on a gear 53 which also has a second set of teeth 54 meshing with two of the gear wheels 25 on the shafts 24.

Figure 2:
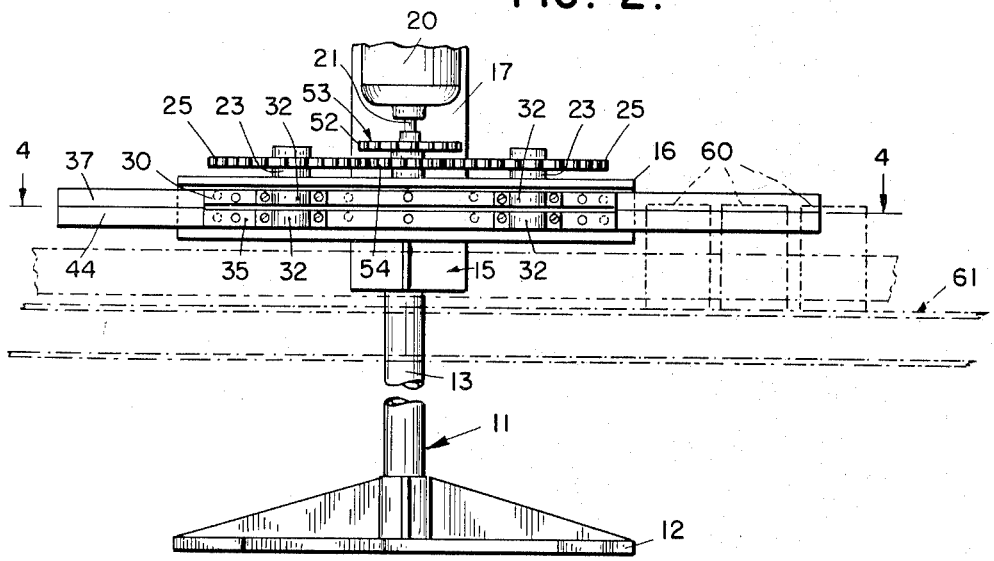
Fig. 2 is a fragmentary side elevational view of the apparatus of Fig. 1.

In the operation of the apparatus the bags 60 or other articles to be sealed are carried upon a conveyor 61 or otherwise fed to the end of the transfer bars shown at the right-hand side of the drawing in Figs. 2, 3, and 4. At this end the transfer bars are provided with a receding inner edge 63 to facilitate feeding the articles thereto. As the articles enter between the transfer bars they are alternately engaged and propelled forward through the machine by the pairs of upper and lower transfer bars. It will be apparent that the main bars upon which the transfer bars are mounted move in circular paths as the shafts 24 rotate maintaining their parallelism. The two main bars of each pair rotate in opposite directions so that they are continually moving toward and away from each other. As the upper pair of main bars are moving toward each other, the lower pair are moving away from each other. Since the transfer bars are resiliently mounted inwardly of the main bars, the transfer bars of each pair engage each other or an article between them during half the rotative movement of the rotary bars. Thus the transfer bars alternately engage and carry forward any articles placed between them. When the articles come between the heating elements or jaws 48, they are subjected to heat and pressure to effectively seal them.

Although the invention has been particularly shown and described, I contemplate that various changes and modifications can be made without departing from the scope thereof as set forth in the claims.

I claim:

1. In means for conveying an article in a given direction, a first pair of opposed transfer bars, a second pair of opposed transfer bars, means supporting the bars of each pair for longitudinal movement in one direction in engagement with each other and for movement in an opposite direction out of engagement with each other, said pairs of bars being adjacently disposed at the same region along the path of travel of the article, means synchronizing said pairs of bars to move oppositely to each other, and actuating means for moving said bars.

2. In means for conveying an article in a given direction, a first pair of parallel members, a second pair of parallel members adjacent said first pair, means supporting said members for synchronized movement in a circular path with the members of each pair moving in opposite directions about laterally spaced axes and with the members of one pair being about 180° ahead relative to the members of the other pair, a transfer bar mounted on each member and extending inwardly of the inner edge of the member, said transfer bars being mounted for limited movement toward their respective members, resilient means between each member and its respective transfer bar urging the same apart, and actuating means for moving said members.

3. Means as set forth in claim 3 in which said resilient means comprises compression springs between said transfer bars and said members.

4. In apparatus for sealing thermoplastic sheets and the like, a pair of opposed jaw members, means for heating said jaw members, a pair of parallel jaw-supporting members, each of said jaw-supporting members being mounted for movement in a circular path about a pair of laterally spaced parallel axes, and means resiliently supporting said jaw members on said jaw-supporting members for limited movement in a plane normal to the axes about which said jaw-supporting members move.

5. Apparatus as defined in claim 4 in which said jaw-supporting members are synchronized for movement in opposite directions.

6. In apparatus for conveying an article, a pair of members mounted for movement in a circular path, said members being laterally spaced in a plane normal to the axes about which they move, a pair of opposed parallel transfer bars, means resiliently supporting said bars on said members for limited movement in a plane normal to the axes about which said members move, and means for moving said members.

7. In apparatus of the type described, a pair of parallel main bars, means supporting said bars for movement in circular paths toward and away from each other, a transfer bar mounted on each main bar for limited movement toward the same, means resiliently urging said transfer bars toward each other and away from their respective main bars, and means for moving said main bars oppositely in circular paths.

8. In apparatus of the type described, a pair of parallel main bars, means supporting said bars for movement in circular paths whereby the bars can move toward and away from each other, said means including a pair of crankshafts journaled in said bars respectively, means for rotating said crankshafts in synchronism, a pair of opposed transfer bars mounted one on each main bar for limited movement toward the main bar, and means resiliently urging the transfer bars way from said main bars.

9. Apparatus as defined in claim 8 in which there is provided a second pair of main bars and a second pair of transfer bars spaced axially of the crankshafts from but adjacent to said first pairs.

10. Apparatus as described comprising a support, two pairs of crankshafts journaled in said support, said shafts being laterally spaced with the axes of the shafts of one pair in a plane parallel to the plane of the axes of the other pair, a pair of axially spaced crank portions disposed at 180° to each other on each shaft, a main bar mounted on the corresponding crank portions of each pair of shafts, a transfer bar mounted on each main bar for limited movement toward the main bar in the plane of movement of the bar, resilient means yieldably urging each transfer bar away from its main bar, and means for rotating the shafts of one pair in one direction and the shafts of the other pair in the other direction in synchronism whereby to cause the main bars to move toward and away from each other alternately in pairs and to cause said pairs of transfer bars to alternately engage and disengage.

11. Apparatus as defined in claim 10 in which one pair of transfer bars supports a pair of heated jaws constructed and arranged to engage an article between said transfer bars.

References Cited in the file of this patent

UNITED STATES PATENTS

| | | |
|---|---|---|
| 2,206,965 | Lakso | July 9, 1940 |
| 2,467,879 | Billeb | Apr. 19, 1949 |